W. STANLEY.
MEANS FOR AND METHOD OF DETERMINING POTENTIAL GRADIENTS.
APPLICATION FILED MAY 13, 1905. RENEWED MAY 5, 1909.

925,606.

Patented June 22, 1909.

UNITED STATES PATENT OFFICE.

WILLIAM STANLEY, OF GREAT BARRINGTON, MASSACHUSETTS, ASSIGNOR TO GENERAL ELECTRIC COMPANY, A CORPORATION OF NEW YORK.

MEANS FOR AND METHOD OF DETERMINING POTENTIAL GRADIENTS.

No. 925,606.　　　　　Specification of Letters Patent.　　　　Patented June 22, 1909.

Application filed May 13, 1905, Serial No. 260,249. Renewed May 5, 1909. Serial No. 494,133.

*To all whom it may concern:*

Be it known that I, WILLIAM STANLEY, a citizen of the United States, residing at Great Barrington, county of Berkshire, Massachusetts, have invented certain new and useful Improvements in Means for and Methods of Determining Potential Gradients, of which the following is a full, clear, and exact description.

My invention relates to means for and method of determining, in accordance with variations of the current on the external circuit, the potential gradient of a dynamo electric machine excited by alternating currents, by which I mean a machine that may be used either as a generator or a motor.

The principal object of my invention, however, is to produce alternating currents having a definite potential gradient under varying conditions. By potential gradient I mean variation in potential with increase of load; thus a positive potential gradient is present when the potential increases as the load increases, and a negative potential gradient is present when the potential decreases with an increase of load. Thus, by the use of my invention I can in one embodiment produce a positive potential gradient when currents of unity power factor are supplied to the work circuit. By another embodiment of my invention I am able to secure a negative potential gradient when currents of unity power factor are supplied to the work circuit, or I may in other embodiments cause the potential gradient similarly to be positive or negative when supplying lagging currents to the external circuits. Various combinations of these embodiments will be readily understood by those skilled in the art which will secure the control of the potential gradient of the machine and the current produced thereby in any predetermined manner under all variations of power factor, of value of current supplied.

The following is a description of an apparatus embodying my invention, and suitable for carrying out my method, reference being had to the accompanying drawings, in which—

Figure 1:
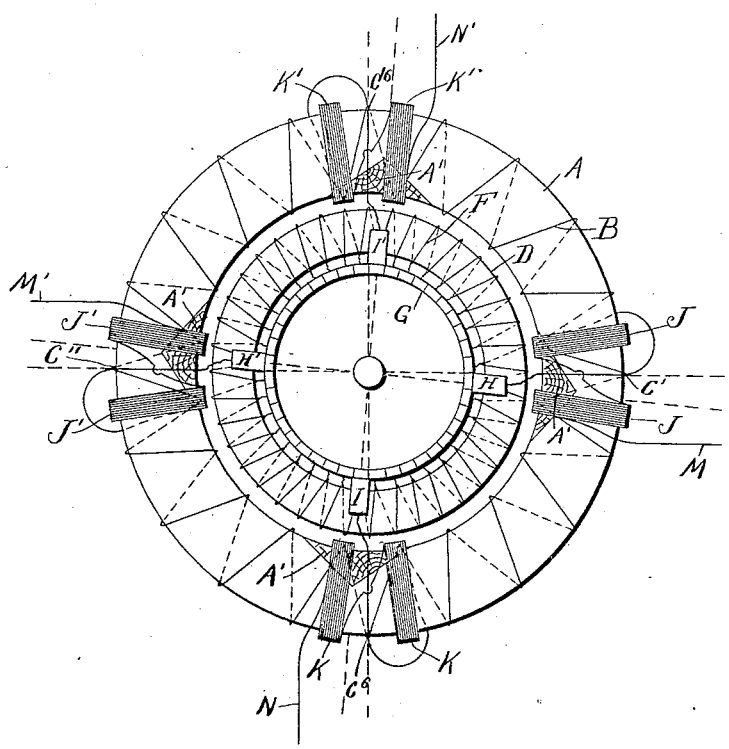
Figure 2:
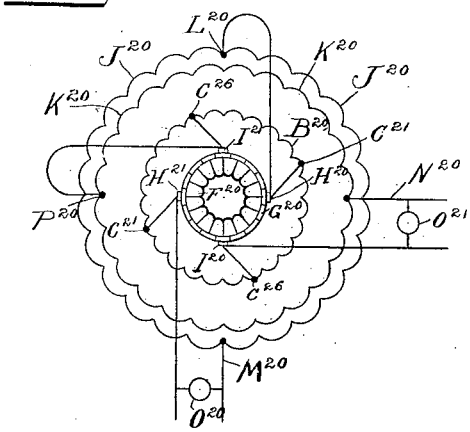
Figure 3:
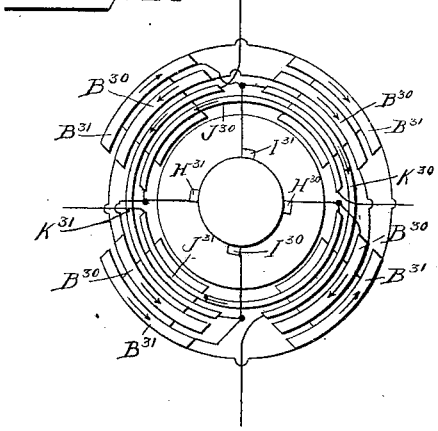
Figure 4:
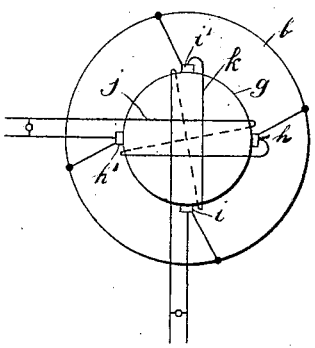
Figure 5:
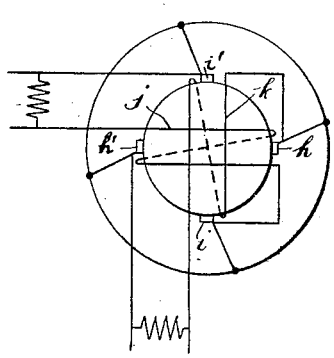
Figure 6:
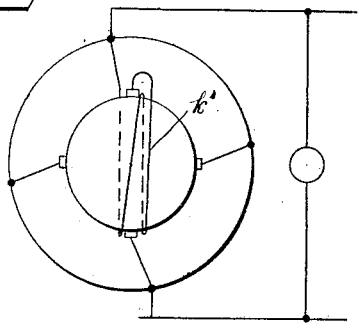
Figure 7:
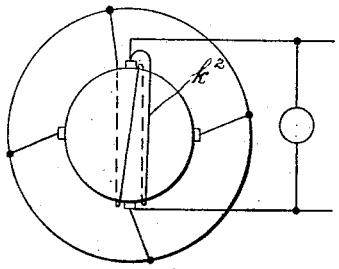

Figure 1 is a diagrammatic view of a dynamo electric machine embodying my invention as suitable for carrying out the method referred to. In this figure part only of the windings are shown as of the distributed type. Fig. 2 is a modification of the apparatus shown in Fig. 1, all of the windings being shown as of the distributed type. Fig. 3 is a further modification in which the stator is shown as of the polar type. In Figs. 1, 2 and 3 the construction is such that the desired potential gradient is secured when currents of unity power factor are supplied to the work circuit. Fig. 4 is a simplified diagram of the windings of Figs. 1, 2 and 3. Fig. 5 is a simplified diagram of the windings of Figs. 1, 2 and 3, with different circuit connections, producing as a result a machine in which the desired potential gradient is produced when currents of zero power factor are supplied to the work circuit. Figs. 6 and 7 are simplified diagrams of the windings of one phase of Figs. 1, 2 and 3, with other modifications of connections the distributing means and compounding coil of the circuit corresponding to the other phase being omitted.

Referring more particularly to the drawings, in Fig. 1, A represents the laminated iron core of a stator or field producing structure having a field producing or magnetizing circuit B, which is preferably of the ordinary distributed winding type, and from which taps $C'$, $C^6$, $C^{11}$, $C^{16}$, are taken at equidistant points for the purpose of connecting them to the two pairs of mains M M' and N N' and to the rotor windings through commutator brushes as hereinafter described. D is the laminated iron core of a rotor, rotatably mounted within the field structure and driven by suitable means. The rotor has the usual closed circuit distributed winding F, connected in the usual manner to the segments of the commutator G, on which bear brushes H H' and I I'. The four brushes H H' and I I' in the structure shown are spaced 90° apart, and in positions nearly opposite the taps $C'$, $C^{11}$, $C^6$, $C^{16}$, to which they are respectively connected, the coils connected to the commutator segments on which the brushes bear being opposite the segments. Thus it will be seen that each brush is connected to the tap nearly opposite it, so that the rotor and field circuit consist on the one hand of a circuit from brush H to tap $C'$, through the field winding B to the diametrically opposite tap $C^{11}$, and thence to the brush H' and the rotor winding F, and on the other hand of a circuit from the brush I to the tap $C^6$ through the field winding to the tap $C^{16}$, and thence to the brush I' and the rotor winding F. The angle between the diameter in which one pair of brushes lies and the diameter in which lie the taps to which they are connected is equal to approximately 90° minus the angular lag of the magnetizing current. Thus, if the machine be constructed to have magnetizing currents lagging 80° behind their electro-motive force, the angular displacement of the intake taps of the inducing circuits of the machine relatively to the brushes to which these taps are connected should be 90° minus 80° or 10°. If the magnetizing currents are to lag nearly 90° the angle between the brushes and the taps to which they are connected should be nearly zero. The angular displacement between the intake taps and the brushes results in a dissymmetrical relation between the magnetic field set up by the windings of the stator and the magnetic field set up by the windings of the rotor with the result that the electro-motive forces in the rotor and stator windings are of different phase. Other means may be used for the bringing about of this dissymmetry which is necessary in order that a magnetizing current shall flow. In the present arrangement the distributed winding of the stator is symmetrical in form and is dissymmetrical in position and thus produces the dissymmetrical field. Various types of stator windings may be used, but this is the preferred arrangement when the distributed winding is used, since the construction is more uniform than it would be if a distributed stator winding dissymmetrical in form were symmetrically placed, and the dissymmetrical field thus obtained. The phase difference of the rotor and stator electro-motive forces results in a local energizing current through the local circuit made up of the stator and rotor windings produced by a resistance electromotive force which is equal to the vector difference between the induced stator electro-motive force and the generated rotor electro-motive force. The stator core has portions A' of non-magnetic material which produce neutral zones for commutation.

The machine as thus far described corresponds to the machine shown and described in my pending application No. 243,842, filed February 2, 1905. In this machine, when the rotor is revolving clockwise the residual magnetism of the machine sets up an electro-motive force in the rotor windings, which produces currents which are fed to the mains and to the stator windings. These currents are alternating currents of a frequency which for a given rate of rotation is determined by the number of turns in the stator and rotor windings, the currents in the energizing windings setting up a clock-wise rotating field in the stator which reacts upon the rotor windings. When energy is being delivered to the work circuit it will be supplied by both the rotor and the stator windings, the proportions varying according to the conditions. The potential gradient of such a simple machine will vary with the value of the resistance and the magnetic leakage of the stator and rotor circuits, and broadly speaking, will be positive for power factor zero currents with the increase of resistance in the stator circuits and be negative with the increase of magnetic leakage in the rotor circuits. Such a machine would deliver currents of unity power factor at constant potential to the external circuit if the resistance and the magnetic leakage of the stator and rotor circuits were of sufficiently negligible values. The normal characteristic of this machine (by which I mean the potential gradient of such machine) when constructed under the restrictions of commercial manufacture is such that when delivering zero power factor or lagging currents to the external circuit the potential gradient of the machine is nearly zero (that is, neither positive nor negative) or may even be of positive value, and when delivering unity power factor currents to the external circuit is negative.

My present invention relates to a means and method of producing a definite potential gradient with a machine such as above described, and is brought about by the use of additional energizing windings which may be termed compounding or compensating windings, which in the embodiment shown in Fig. 1 consist of the coils J J' and K K' placed in series with the supply mains, or connected so as to be traversed by current flowing to the work circuits. These coils J J' and K K' are so placed relative to the stator as to reinforce the magnetic field when the currents of unity power factor are supplied to the mains as for instance when the load is non-inductive. The coils J J' tend to produce a vertical polar line while the coils K K' tend to produce a horizontal polar line. They both being of different phase, therefore, tend to superimpose a rotating magnetizing field upon the field produced by the winding B, the direction of rotation of the superimposed field being the same as the direction of rotation of the original field. Inasmuch as the magnetizing current in the winding B lags substantially 90°, and, by assumption, the current in the coils J J' and K K' is of unity power factor, the phases of magnetism of the original and superimposed fields will correspond, and the magnetic field of the machine as a whole will increase or diminish with the increase or decrease of the current in the work circuit.

Fig. 2 shows a modification of Fig. 1 in which the compounding windings constituting the compounding coils are of the distributed type. In this figure $B^{20}$ is the main energizing winding, $F^{20}$ is the armature winding connected to the commutator $G^{20}$. $H^{20}$ $H^{21}$ and $I^{20}$ $I^{21}$ are the commutator brushes bearing upon the commutator and connected to the winding $B^{20}$ at the points $C^{21}$, $C^{26}$. $J^{20}$ is one of the compounding windings and $K^{20}$ is the other of the compounding windings. The brush $H^{20}$ in addition to being connected to the winding $B^{20}$ at the point $C^{21}$ is connected to the winding $J^{20}$ at the point $L^{20}$. One of the mains $M^{20}$ is connected to the winding $J^{20}$ at a point diametrically opposite the point $L^{20}$, while the other main for that work circuit is connected to the brush $H^{21}$. The circuit for the work current flowing from the brushes $H^{20}$ and $H^{21}$ is, therefore, from the armature $F^{20}$ or stator $B^{20}$, or both, to brush $H^{20}$, to point $L^{20}$, through winding $J^{20}$ to main $M^{20}$, through the translating device $O^{20}$ and back to the brush $H^{21}$ to the armature $F^{20}$. The brush $I^{21}$ in addition to being connected to the main winding $B^{20}$, is connected to the winding $K^{20}$ at the point $P^{20}$. From a point diametrically opposite the point $P^{20}$ leads one of the mains $N^{20}$ of the other work circuit, the other main to that work circuit being connected to the brush $I^{20}$, so that the circuit or current flowing to the work circuit from the brushes $I^{20}$ $I^{21}$ is from brush $I^{21}$ to point $P^{20}$, thence through the distributed winding $K^{20}$ to the main $N^{20}$, thence through the translating device $O^{21}$, and thence back to the brush $I^{20}$ to the armature winding $F^{20}$. In this form, as in the form shown in Fig. 1, the compensating winding connected to the horizontal brushes sets up a magnetic field lying in a vertical plane, while the compensating or compounding winding connected to the vertical brushes sets up a magnetizing field in a horizontal plane. Inasmuch as the currents flowing from the energizing winding $B^{20}$ are magnetizing currents lagging substantially 90° behind their electro-motive force, and the currents flowing to the work circuit are by assumption unity power factor current, the work currents will set up magneto motive forces which are in phase with the magneto motive forces of the currents in the energizing windings, and thus as the load increases build up the magnetic field. Since the currents flowing to the work circuit are two phase currents of the same frequency as the two phase currents flowing to the energizing windings, a superimposed magnetizing field is produced by the work currents which will rotate synchronously with the magnetizing rotating field produced by the currents in the energizing windings and reinforce that field at all times.

Fig. 3 shows a modified apparatus in which a stator of polar form is employed. In this form the horizontal brushes $H^{30}$ $H^{31}$ are connected to energizing coils $B^{30}$, those on the right hand poles being wound in one direction, while the coils $B^{30}$ on the left hand poles are wound in the other direction, as indicated by arrows. The vertical brushes $I^{30}$ $I^{31}$ are connected to energizing windings $B^{31}$. Those on the upper poles are wound in one direction, while those on the lower poles are wound in the opposite direction. Surrounding the upper poles and connected between the brush $H^{31}$ and the external circuit, is a compounding coil $J^{30}$, while surrounding the lower poles and connected to the brush $H^{30}$ is a compounding coil $J^{31}$. Surrounding the left hand poles and connected to the brush $I^{30}$ is a compounding coil $K^{31}$, while surrounding the right hand poles and connected to the brush $I^{31}$ is a compounding coil $K^{30}$. The coils $J^{30}$ $J^{31}$ and $K^{30}$ $K^{31}$ being traversed by currents of different phase, also sets up a rotating field. The compounding coils are so wound, as indicated by arrows, that the rotating field produced thereby coincides in phase with the rotating field produced by the energizing coils $B^{30}$ $B^{31}$, and since the compounding coils are in series with the work circuits the superimposed field increases and diminishes with an increase or decrease of the currents supplied to the work circuit. As in the arrangement heretofore described since the currents in the energizing windings lag substantially 90° behind their electro-motive forces and the currents in the compounding coil are in phase with the electro-motive forces, and since the compounding coils are displaced by 90° from the energizing coils, the fields produced by the energizing coils and the compounding coils will coincide in time.

In the construction shown in Fig. 3, on the assumption that the energizing windings $B^{30}$ $B^{31}$ all have the same number of turns, the brushes $H^{30}$ $H^{31}$ and $I^{30}$ $I^{31}$ should be set a little off the lines passing through the center of the inter-polar space, in order that the rotor field and the field set up by the energizing windings should be dissymmetrical, so that an energizing current may flow, as explained in connection with the arrangement of Fig. 1.

Fig. 4 shows a simplified diagram of the windings of any one of the three figures above referred to, $g$ representing the commutator, $h$ $h'$ representing the horizontal brushes, $i$ $i'$ the vertical brushes, $b$ the energizing winding to which the commutator brushes are connected so as to set up a dissymmetrical field, $j$ the compensating winding producing a vertical magnetic field and connected to the brush $h$, and $k$ the compensating coil producing a horizontal magnetizing field and connected to the brush $i'$, the work circuits being connected to the coil $j$ and the brush $h'$ on the one hand and to the coil $k$ and the brush $i$ on the other hand.

In Fig. 5 the same coils as are present in Fig. 4 are shown, with different connections. In this case the coil $j$ producing the vertical magnetization is connected to the brush $i$, and the coil $k$ producing the horizontal magnetization is connected to the brush $h$. Translating devices of low power factor are connected to the coil $j$ and the brush $i'$ on the one hand and to the coil $k$ and the brush $h'$ on the other hand. This arrangement is used when currents of zero or low power factor are supplied to the work circuit. When zero power factor currents are supplied, the magneto-motive forces of the compounding coils will coincide in phase with the magneto-motive forces of the energizing windings, for the reason that the magnetic axis of the compounding coil which is assisting the energizing winding coincides with the magnetic axis of that winding, and the currents of both compounding coil and energizing winding lag substantially 90° behind their common electro-motive force. The currents in the work circuit will therefore reinforce the magnetic field as before, and as the current in the work circuit increases, the potential of the machine will increase.

It is to be noted that in all these cases the compounding windings are displaced from the main energizing windings connected to the same brushes by approximating the complement of the angle of lag of the current in the work circuit.

In Fig. 6 I have shown the work circuit of but one of the two phases and the energizing coil corresponding thereto, the other being omitted for the sake of simplicity. In this instance I have shown the compounding coil as connected between one of the brushes and the stator tap, the main being directly connected to the tap, this being a useful connection in some cases. In this instance $k'$ is the coil connected between the brush and its stator tap.

In Fig. 7 I have shown still another arrangement, in which a compounding coil $k^2$ is connected between the brush and its stator tap, the main being connected directly to the brush, this being an arrangement which possesses certain advantages under some conditions. In this instance I have shown a compounding coil of but one of the two phases, the other together with its work circuit being omitted for the sake of simplicity. The arrangement of Fig. 6 is used when the conditions are such that it is desired to compensate by currents flowing to the line from the rotor. The arrangement of Fig. 7 is used when it is desired to compensate by currents flowing to the line from the stator.

It will be noted that in each instance in which the axes of the main and compounding coils are displaced by approximately the complement of the angle of lag of the current in the work circuit, current delivered to the main line superimposes a magnetization coinciding in direction with that produced by the lagging magnetizing currents in the main field and rotor magnetizing circuits of the machine. Thus, for example, referring to Fig. 1, if the magnetizing circuits of the machine, namely the rotor and stator windings, produce at a given instant a flux threading the rotor and entering the stator substantially on a horizontal line, there will be at such instant a maximum electro-motive force upon the vertical portion of the rotor and the taps $C^6$ and $C^{16}$ of the stator connected to such portions, and therefore a maximum terminal electro-motive force applied to the circuit connected to them. If, now, a current of power factor unity value is demanded by the external circuit and such a current is caused to flow through the supplemental magnetizing coils K K', it would tend to set up a magnetic field in a horizontal line whose magnetic axis coincides with the magnetic axis of the main flux of the machine above referred to, the flow of such current to the external circuit will produce an additional increment of flux in the machine, increasing its magnetization and consequently the terminal electro-motive force upon the rotor and stator terminals. The second pair of commutating or compounding coils J J' placed at right angles to the first, and similarly connected to the terminals supplying the current to the other external circuit will, after 90° of time, also reinforce the flux of the machine increasing the electro-motive force at the terminals. At intermediate times the coils J J' and K K' will act together, to produce an added increment to the original magnetization and thus reinforce the flux of the machine and increase the electro-motive force at the terminals at such intermediate times, the action of the compounding coils above described being such as to superimpose upon the original rotating field a second rotating field and thus produce a resultant rotating field greater than the original.

With any fixed connection of compounding coils to definite terminals such as that above described, there will be a maximum compounding effect when the phase of the current traversing the compounding coil produces a flux coinciding in phase with the main flux of the machine, and with the connections of Figs. 1, 2 and 3, for instance, the compounding effect will be reduced in value in accordance with the displacement of the phase of such current in the compounding coil, and be minimum when the flux produced by the coil is at right angles to the flux produced by the main magnetizing circuit. Thus, in the case above given, a power factor unity current will produce a flux coinciding with and practically added to the main flux of the machine, while with power factor equal to zero current delivered to the external current the flux delivered to the compounding coil will be at right angles to the main flux of the machine, and will therefore not materially increase the total flux produced. If, however, the compounding coils are shifted 90° or what amounts to the same thing, the vertically compounding coils J J' are connected in series respectively with the vertical brushes, and the horizontally compounding coils K K' are connected in series with the horizontal brushes, as in Fig. 5, the machines will have a positive potential gradient when the load upon the work circuit is of zero power factor. This results from the fact that both coils and the currents passing through them are displaced 90° from the connections and conditions described in connection with Figs. 1, 2 and 3, so that the magnetizing forces of the zero power factor in the main circuit coincide with the magnetizing forces of the currents in the energizing winding.

In the above description it has been assumed that the desired potential gradient of the machine is positive. By reversing the magnetizing effect of the compounding coils in the various positions described a negative potential gradient will be obtained.

By dissymmetrical windings, as that term is used in this specification, I do not refer to the dissymmetrical location of the winding shown and described in the drawings, but rather to the fact that the winding produces a field which is dissymmetrical relatively to the field produced by the currents in the rotor winding, since in various forms the winding may be symmetrical in construction and dissymmetrical in location, or may be symmetrical in location and dissymmetrical in construction, and in either case constitute the dissymmetrical winding of my invention, and produce the necessary dissymmetrical field.

The broad invention is not limited to use in machines having windings of any particular type, since it can be adapted to machines having various forms, such for instance as separately excited machines, in which case dissymmetry is not essential, and self-exciting machines in which various types of windings may be used to set up in the stator fields relatively dissymmetrical to the rotor field. The invention is capable of being carried out by many different forms of apparatus, and the apparatus shown is subject to various modifications, as will be evident to those skilled in the art.

What I claim is:

1. In a dynamo electric machine the combination of a work circuit, rotor and stator windings, connections between said windings and to said work circuit such that each of said windings is traversed by alternating exciting and work currents and compensating coils traversed by said work currents.

2. In a dynamo electric machine, the combination of a rotor and a stator each provided with windings, a commutator carried by said rotor and connected to the windings thereof, brushes bearing upon said commutator connections between said brushes and said stator windings, said stator windings being dissymmetrical relatively to said rotor windings, and work circuits connected to said connections, the said windings being each traversed by alternating exciting and work currents and compensating coils traversed by alternating work currents flowing to said work circuits.

3. In a dynamo electric machine, the combination of a rotor having an induced winding thereon, a commutator connected to said rotor windings, brushes bearing thereon and work circuits connected thereto, a stator having a symmetrically constructed winding dissymmetrically located relatively to said rotor windings and connected to said brushes, so that each of said windings is traversed by alternating exciting and work currents and compensating coils traversed by energy currents supplied by said rotor windings to said work circuits.

4. In a dynamo electric machine, the combination of rotor windings, stator windings, means for supplying alternating currents to said stator windings, work circuits and compensating windings traversed by alternating currents flowing to said work circuits, the compensating windings of one circuit being displaced relatively to the inducing windings by an angle depending on the lag of the current in the main circuit relatively to its electro-motive force.

5. In a dynamo electric machine, the combination of rotor windings, stator windings, a commutator connected to said rotor windings, brushes bearing thereon and connected to said stator windings, work circuits connected to said brushes, and compensating coils traversed by currents flowing to said work circuit and displaced relatively to said stator windings by approximately the complement of the angle of lag of said work current.

6. The method of producing a desired potential gradient which consists in establishing by multiphase currents, an original rotating magnetic field, acting inductively by said field upon both stationary and rotating windings, producing by such action induced alternating work currents in both of said windings and establishing by such currents after leaving said windings a magnetic field superimposed upon said original field.

7. The method of producing a desired potential gradient which consists in establishing by multiphase alternating currents a rotating magnetic field, acting inductively by said field upon both stationary and rotating windings, producing induced alternating work currents in both of said windings through such action and establishing by such currents after leaving said windings a superimposed rotating magnetic field whose polar line coincides approximately with the rotating polar line of the original field.

8. The method of producing a desired potential gradient which consists in rotating induced windings in a residual field, producing thereby multiphase currents, impressing upon said field by said multiphase currents a rotating magnetic field also acting inductively on said rotating windings and upon stationary windings so as to set up phase differing electro-motive forces, producing thereby in both windings work currents and establishing by said work currents after leaving said windings a rotating magnetic field superimposed upon said first rotating field.

WILLIAM STANLEY.

Witnesses:
 HERBERT M. SMITH,
 J. FACCIOLI.